(12) United States Patent
Watanabe et al.

(10) Patent No.: US 9,443,527 B1
(45) Date of Patent: Sep. 13, 2016

(54) SPEECH RECOGNITION CAPABILITY GENERATION AND CONTROL

(71) Applicant: Amazon Technologies, Inc., Reno, NV (US)

(72) Inventors: Yuzo Watanabe, Seattle, WA (US); Arushan Rajasekaram, Seattle, WA (US); Rajiv Ramachandran, Seattle, WA (US); Mark Steven Baumback, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 119 days.

(21) Appl. No.: 14/040,011

(22) Filed: Sep. 27, 2013

(51) Int. Cl.
*G10L 21/00* (2013.01)
*G10L 15/26* (2006.01)
*G10L 15/22* (2006.01)
*G10L 15/08* (2006.01)
*G10L 15/30* (2013.01)

(52) U.S. Cl.
CPC .............. *G10L 21/00* (2013.01); *G10L 15/22* (2013.01); *G10L 15/265* (2013.01); *G10L 15/08* (2013.01); *G10L 15/30* (2013.01)

(58) Field of Classification Search
USPC ........... 704/9, 231, 275, 201, 238, 239, 240, 704/251, 255, 270
See application file for complete search history.

(56) References Cited

U.S. PATENT DOCUMENTS

| | | | |
|---|---|---|---|
| 6,975,993 B1* | 12/2005 | Keiller | G10L 15/26 704/270.1 |
| 2011/0313775 A1* | 12/2011 | Laligand | H04N 21/234336 704/275 |
| 2013/0030802 A1* | 1/2013 | Jia | G10L 15/06 704/231 |

\* cited by examiner

*Primary Examiner* — Vu B Hang
(74) *Attorney, Agent, or Firm* — Ilan Barzilay; Cyrus Miller; Seyfarth Shaw LLP

(57) ABSTRACT

A system for controlling multiple devices using automatic speech recognition (ASR) even when the devices may not be capable of performing ASR themselves. A device such as a media player, appliance, or the like may be recognized by a network. The configured controls for the device (such as a remote control or other mechanism) are incorporated into a device control registry which catalogs device command controls. Individual ASR grammars are constructed for the devices so speech commands for those devices may be processed by an ASR device. The ASR device may then process those speech commands and convert them into the appropriate inputs for the controlled device. The inputs may then be sent to the controlled device, resulting in ASR control for non-ASR devices.

19 Claims, 9 Drawing Sheets

SPEECH RECOGNITION CAPABILITY GENERATION AND CONTROL

BACKGROUND

Human-computer interactions have progressed to the point where humans can control computing devices, and provide input to those devices, by speaking Computing devices employ techniques to identify the words spoken by a human user based on the various qualities of a received audio input. Such techniques are called speech recognition or automatic speech recognition (ASR). Speech recognition combined with natural language processing techniques (together called speech processing) may allow a user to control a computing device to perform tasks based on the user's spoken commands. Speech recognition may also convert a user's speech into text data which may then be provided to various textual based programs and applications.

Speech recognition may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

As automatic speech recognition (ASR) has become more widespread, the ability to control many different devices using speech controls has similarly expanded. Many devices, however, are not configured with ASR capabilities and thus are limited to traditional non-speech controls such as touchscreens with graphical user interfaces (GUIs), infrared remote controls, internet enabled controls, and the like. ASR capable devices, however, may also come equipped with input/output interfaces that connect to a network or other outputs that enable communication with non-ASR devices. As described here, by connecting ASR devices with non-ASR devices, a system may be configured to control non-ASR devices with speech commands.

To perform speech control of non-ASR devices, one or more ASR devices may be configured to learn the capabilities of one or more non-ASR devices and how those capabilities are controlled in each non-ASR device. ASR and natural language processing grammars and settings may be defined for a particular non-ASR device based on the non-ASR device's identity, type, capabilities, etc. These settings allow a user to speak a command for the non-ASR device into the ASR device and have the ASR device convert the speech into an instruction understandable to the non-ASR device. As used herein a command includes any function that a user may control in a device, including both affirmative commands for a device to perform a function as well as queries form a user to a device, etc. The ASR device may then communicate the instruction to the non-ASR device. In this manner, an expanded ASR system may be constructed including at least one ASR device and one or more non-ASR devices in communication with the ASR device.

Figure 1:
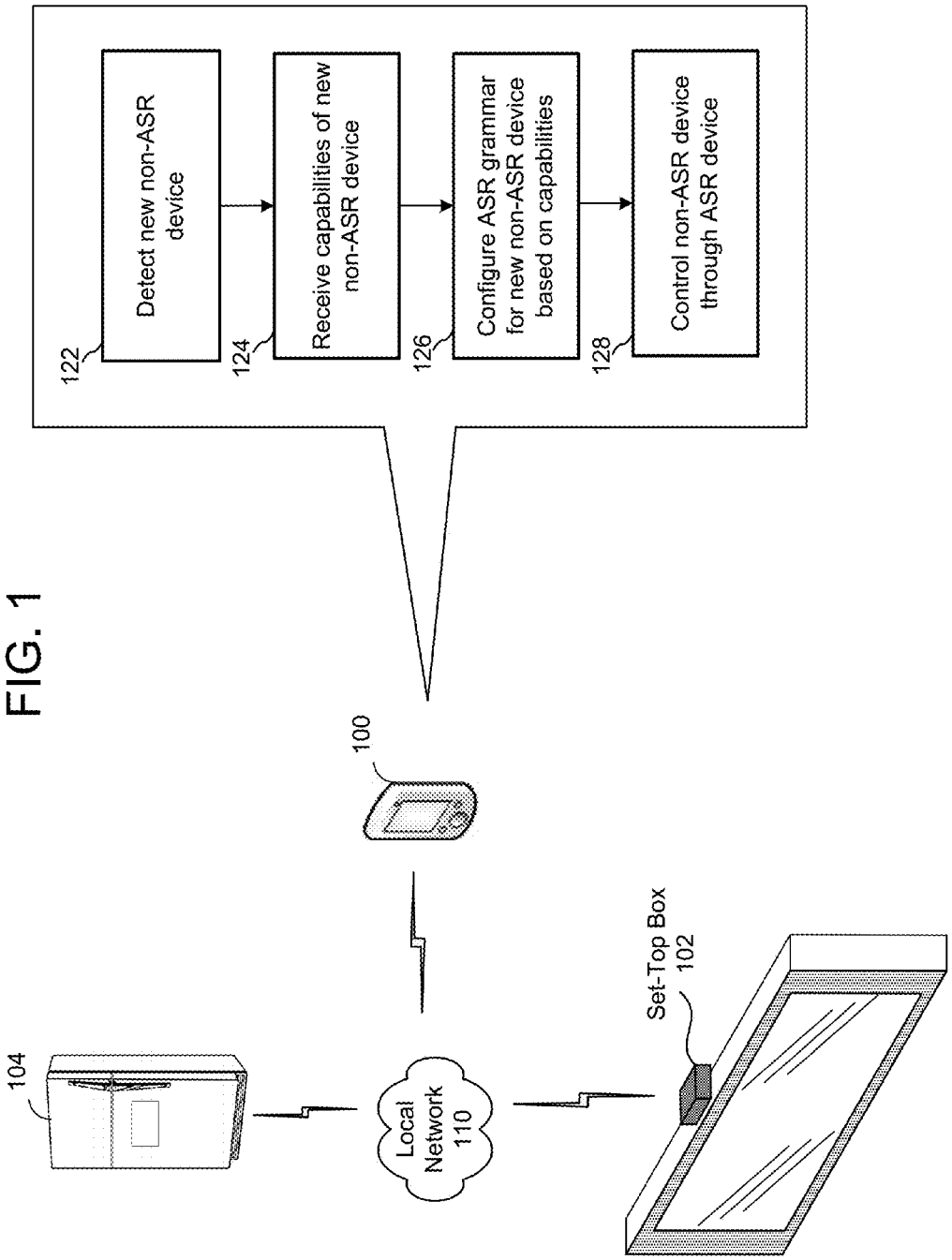
FIG. 1 illustrates a system for configuring speech recognition control according to one aspect of the present disclosure.

An example of a system for controlling non-ASR devices through speech is shown in FIG. 1. An ASR capable device 100 is connected to a local network 110. The local network 110 may be in a user's home, in a business, in a school, etc. Although illustrated as a local network, the network 110 may also be a geographically wide network, such as the Internet. The local network 110 connects the ASR capable device 100 to other devices which can communicate over the local network 110, such as set-top box 102. Further, although pictured as communicating over the local network 110, the ASR device 100 and other devices, such as set-top box 102 may also communicate through other means such as a wired connection, infrared (IR) interface, etc.

When a new device that is not ASR-capable (but is capable of communicating with other devices), such as refrigerator 104, becomes accessible to the local network 110, the ASR device 100 detects the new non-ASR device, as shown in block 122. The ASR device then receives information about the capabilities of the new non-ASR device that are controllable over the local network 110 or through another interface, as shown in block 124. For example, the ASR device 100 may learn that the refrigerator 104 is capable of controlling temperature for multiple zones of the refrigerator, making ice, displaying images on a built-in screen, adjusting an internal light setting, setting one or more internal timers to control other functions, etc. The information about the new device's capabilities may come from the device itself in response to a request made by the ASR device 100, or may come from another device, such as remote server accessible through the Internet, which catalogs and distributes information about the remotely controllable capabilities of various devices.

When the ASR device 100 receives the capabilities of the new non-ASR device, it configures a grammar or other ASR/natural language processing settings based on the capabilities of the new device, as shown in block 126. The grammar may be available for the ASR device 100 to download, such as from the remote server, or the ASR device may configure a grammar based on interactions with the new device and/or a user, as described below. Once the grammar/settings are incorporated into the ASR device 100, the ASR device 100 will now be able to better process incoming speech that includes words directed at controlling the new device, such as the refrigerator 104. The ASR device 100 will now also be able to convert that speech into commands that are recognizable by the new device, such that the ASR device 100 may issue instructions to the new device and control the non-ASR device through the ASR device, as shown in block 128. The non-ASR device is now controllable by a user through spoken commands processed by the ASR device 100. Further details are provided below.

Figure 2:
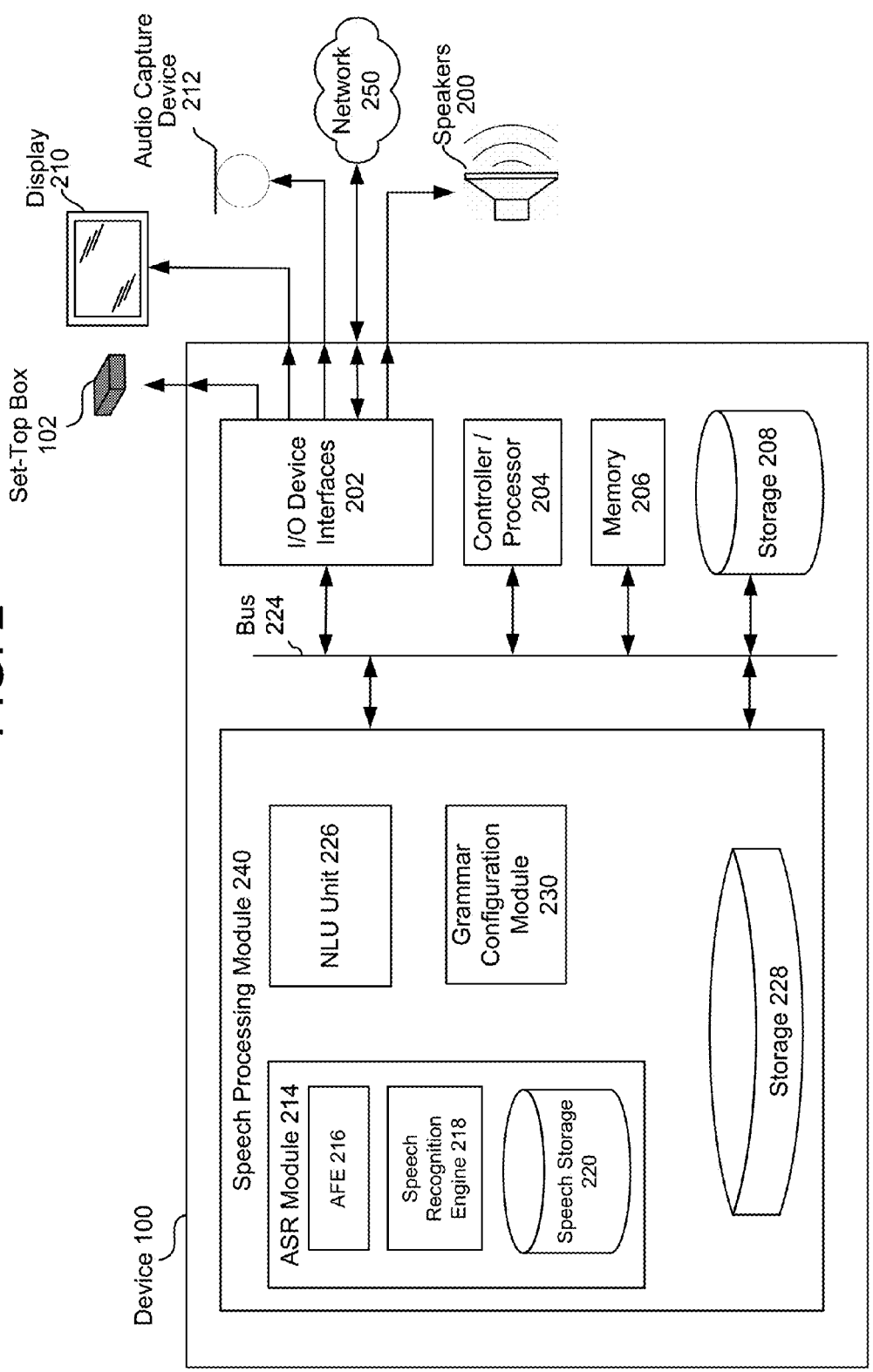
FIG. 2 is a block diagram conceptually illustrating a device for performing speech recognition according to one aspect of the present disclosure.

FIG. 2 is a block diagram conceptually illustrating a system including the ASR device 100 for performing speech recognition and device control. Aspects of the present disclosure include computer-readable and computer-executable instructions that may reside on the ASR device 100. FIG. 2 illustrates a number of components that may be included in the ASR device 100, however other non-illustrated components may also be included. Also, some of the illustrated components may not be present in every device capable of employing asp ects of the present disclosure. Further, some components that are illustrated in the ASR device 100 as a single component may also appear multiple times in a single device. For example, the ASR device 100 may include multiple input devices, output devices, or multiple controllers/processors 204.

Multiple ASR devices may be employed in a single speech recognition system. In such a multi-device system, the ASR devices may include different components for performing different aspects of the speech recognition process. The multiple devices may include overlapping components. The ASR device as illustrated in FIG. 2 is exemplary, and may be a stand-alone device or may be included, in whole or in part, as a component of a larger device or system.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The ASR device 100 may also be a component of other devices or systems that may provide speech recognition functionality such as automated teller machines (ATMs), kiosks, home appliances (such as refrigerators, ovens, etc.), vehicles (such as cars, buses, motorcycles, etc.), and/or exercise equipment, for example.

As illustrated in FIG. 2, the device 100 includes a variety of components which may communicate through an address/data bus 224. Each component may also be directly connected to other components in addition to (or instead of) being connected to other components across the bus 224. The ASR device 100 may include an audio capture device 212 for capturing spoken utterances for processing. The audio capture device 212 may include a microphone or other suitable component for capturing sound. The audio capture device 212 may be integrated into the ASR device 100 or may be separate from the ASR device 100.

The device 100 includes one or more controllers/processors 204 for processing data and computer-readable instructions, and a memory 206 for storing data and processor-executable instructions. The memory 206 may include volatile random access memory (RAM), non-volatile read only memory (ROM) or flash memory, and/or other types of memory. Also included is a non-volatile data storage component 208, for storing data and instructions. The data storage component 208 may include one or more storage types of non-volatile storage such as magnetic storage, optical storage, solid-state storage, etc. The ASR device 100 may also be connected to removable or external memory and/or storage (such as a removable memory card, memory key drive, networked storage, etc.) through the input/output device interfaces 202. Data and instructions may be loaded selectively loaded into memory 206 from storage 208 at runtime, although instructions may also be embedded as firmware such as instructions stored the non-volatile flash or ROM.

The device 100 includes input/output (I/O) device interfaces 202. A variety of input/output devices may be used and the connections between the devices and the device 100 may be wired, optical or wireless. Example input devices include the audio capture device 212, a touch input device, keyboard, mouse, stylus or other input device. Example output devices include a visual display 210, tactile display, audio speakers 200, headphones, printer or other output device. The input/output device interfaces 202 may also include an interface for an external peripheral device connection such as universal serial bus (USB), FireWire, Thunderbolt or other connection protocol. The input/output device interfaces 202 may also include a network connection such as an Ethernet port, modem, etc. The input/output device interfaces 202 may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 2G network, etc. Through one or more of these connections the device 100 may connect to a network 250.

Figure 3:
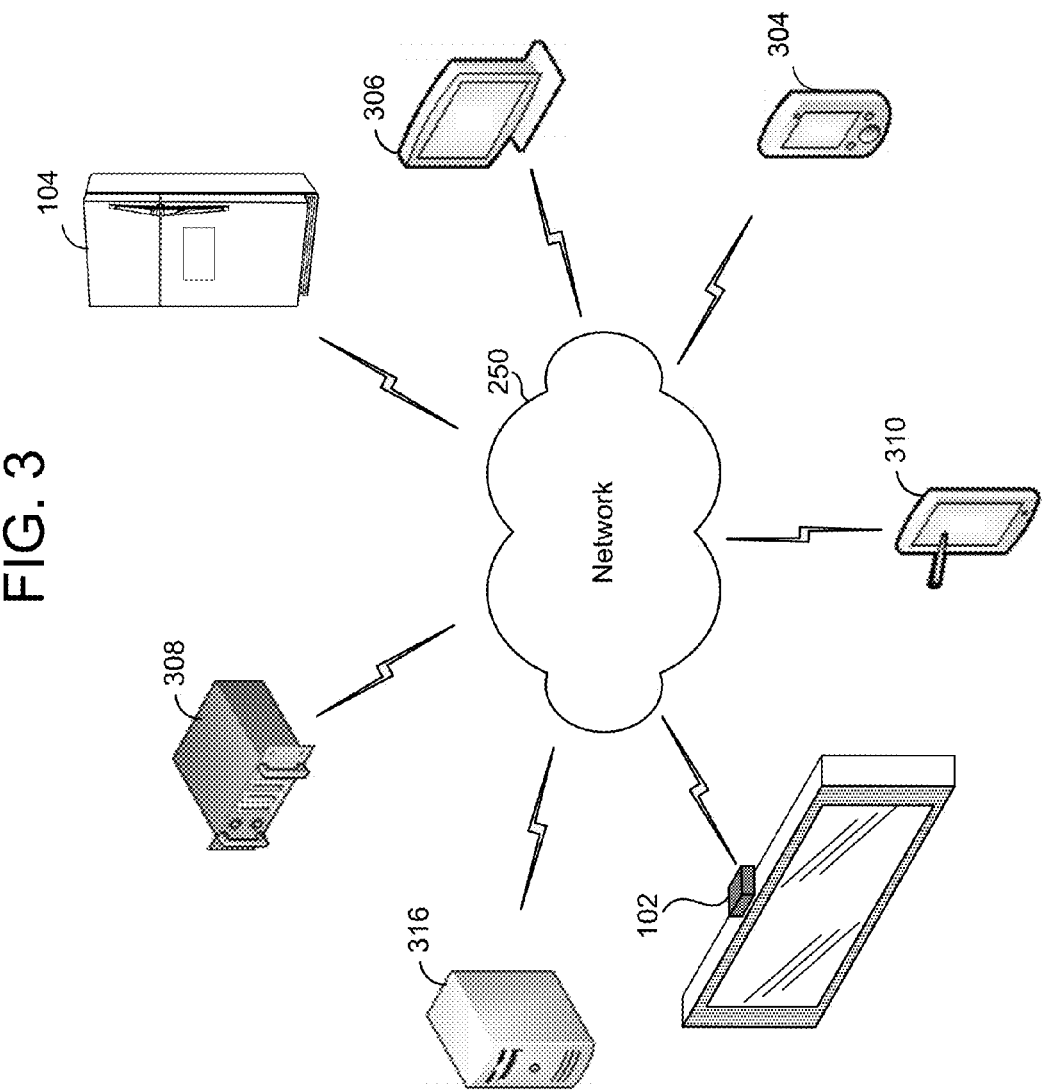
FIG. 3 illustrates a network of devices according to one aspect of the present disclosure.

FIG. 3 shows multiple devices connected over the network 250. Network 250 may include a local or private network, such as local network 110, or may include a wide network such as the Internet. Devices may be connected to the network 250 through either wired or wireless connections. For example, a wireless device 304 may be connected to the network 250 through a wireless service provider. Other devices, such as computer 316, may connect to the network 250 through a wired connection. Other devices, such as home appliances like refrigerator 104 or display 306, for example, located in a home or kiosks in a shopping establishment, etc., may connect to the network 250 through a wired or wireless connection. Other devices, such as set-top box 102 or tablet computer 310 may be capable of connection to the network 250 using various connection methods including through a wireless service provider, over a WiFi connection, or the like. Networked devices may input spoken audio through a number of audio input devices including through headsets (not shown) Audio input devices may be connected to networked devices either through a wired or wireless connection. Networked devices may also include embedded audio input devices, such as an internal microphone (not pictured) in wireless device 304 or tablet computer 310.

The devices shown in FIG. 3 may be ASR devices, or may be non-ASR devices. For example, wireless device 304 may include ASR capabilities while refrigerator 104 does not have ASR capabilities. ASR capabilities may also be divided across devices connected to the network 250. For example, in certain ASR system configurations, one device may capture an audio signal and another device may perform the ASR processing. For example, audio input to the wireless device 304 may be sent over the network 250 to computer 316 or server 308 for processing. Or wireless device 304 may partially process the audio signal before sending it over the network 250. Because ASR processing may involve significant computational resources, in terms of both storage and processing power, such split configurations may be employed where the device capturing the audio has lower processing capabilities than a remote device and higher quality ASR results are desired. The audio capture may occur near a user and the captured audio signal sent to another device for processing. Further, one or more devices may catalog capabilities of non-ASR devices and corresponding grammars to enable control of the non-ASR devices using specially configured ASR devices.

Returning to FIG. 2, the input/output device interfaces 202 may also directly connect to other devices such as the set-top box 102, and the like. Some or all of these devices may also be integrated with the device 100, such as when the device 100 itself is combined with the set-top box or included within a television, or when the device 100 is incorporated to some other appliance or device to form a single integrated unit. If the connected devices are external, the I/O device interfaces 202 may include a control link to those devices such as through infrared "blaster" or other wired or wireless control interface, enabling the device 100 to control the other devices. One or more controls for other devices may also be included within the I/O device interfaces 202.

The device may also include an ASR module 214 for processing spoken audio data into text. The ASR module may be part of a speech processing module 240 or may be a separate component. The ASR module 214 transcribes audio data into text data representing the words of the speech contained in the audio data. The text data may then be used by other components for various purposes, such as executing system commands, inputting data, etc. Audio data including spoken utterances may be processed in real time or may be saved and processed at a later time. A spoken utterance in the audio data is input to the ASR module 214 which then interprets the utterance based on the similarity between the utterance and models known to the ASR module 214. For example, the ASR module 214 may compare the input audio data with models for sounds (e.g., speech units or phonemes) and sequences of sounds to identify words that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language model or grammar). Based on the considered factors and the assigned recognition score, the ASR module 214 may output the most likely words recognized in the audio data. The ASR module 214 may also output multiple alternative recognized words in the form of a lattice or an N-best list (described in more detail below).

While a recognition score may represent a probability that a portion of audio data corresponds to a particular phoneme or word, the recognition score may also incorporate other information which indicates the ASR processing quality of the scored audio data relative to the ASR processing of other audio data. A recognition score may be represented as a number on a scale from 1 to 100, as a probability from 0 to 1, a log probability or other indicator. A recognition score may indicate a relative confidence that a section of audio data corresponds to a particular phoneme, word, etc.

The ASR module 214 may be connected to the bus 224, input/output (I/O) device interfaces 202, controller/processor 204 and/or other component of the ASR device 100. Audio data sent to the ASR module 214 may come from the audio capture device 204 or may be received by the input/output device interfaces 202, such as audio data captured by a remote entity and sent to the ASR device 100 over a network. Audio data may be in the form of a digitized representation of an audio waveform of spoken utterances. The sampling rate, filtering, and other aspects of the analog-to-digital conversion process may impact the overall quality of the audio data. Various settings of the audio capture device 212 and/or input/output device interfaces 202 may be configured to adjust the audio data based on traditional tradeoffs of quality versus data size or other considerations.

The ASR module 214 includes an acoustic front end (AFE) 216, a speech recognition engine 218, and speech storage 220. The AFE 216 transforms audio data into data for processing by the speech recognition engine 218. The speech recognition engine 218 compares the speech recognition data with the acoustic, language, and other data models and information stored in the speech storage 220 for recognizing the speech contained in the original audio data. The AFE 216 and speech recognition engine 218 may include their own controller(s)/processor(s) and memory or they may use the controller/processor 204 and memory 206 of the ASR device 100, for example. Similarly, the instructions for operating the AFE 216 and speech recognition engine 218 may be located within the ASR module 214, within the memory 206 and/or storage 208 of the ASR device 100, or within an external device.

Figure 4:
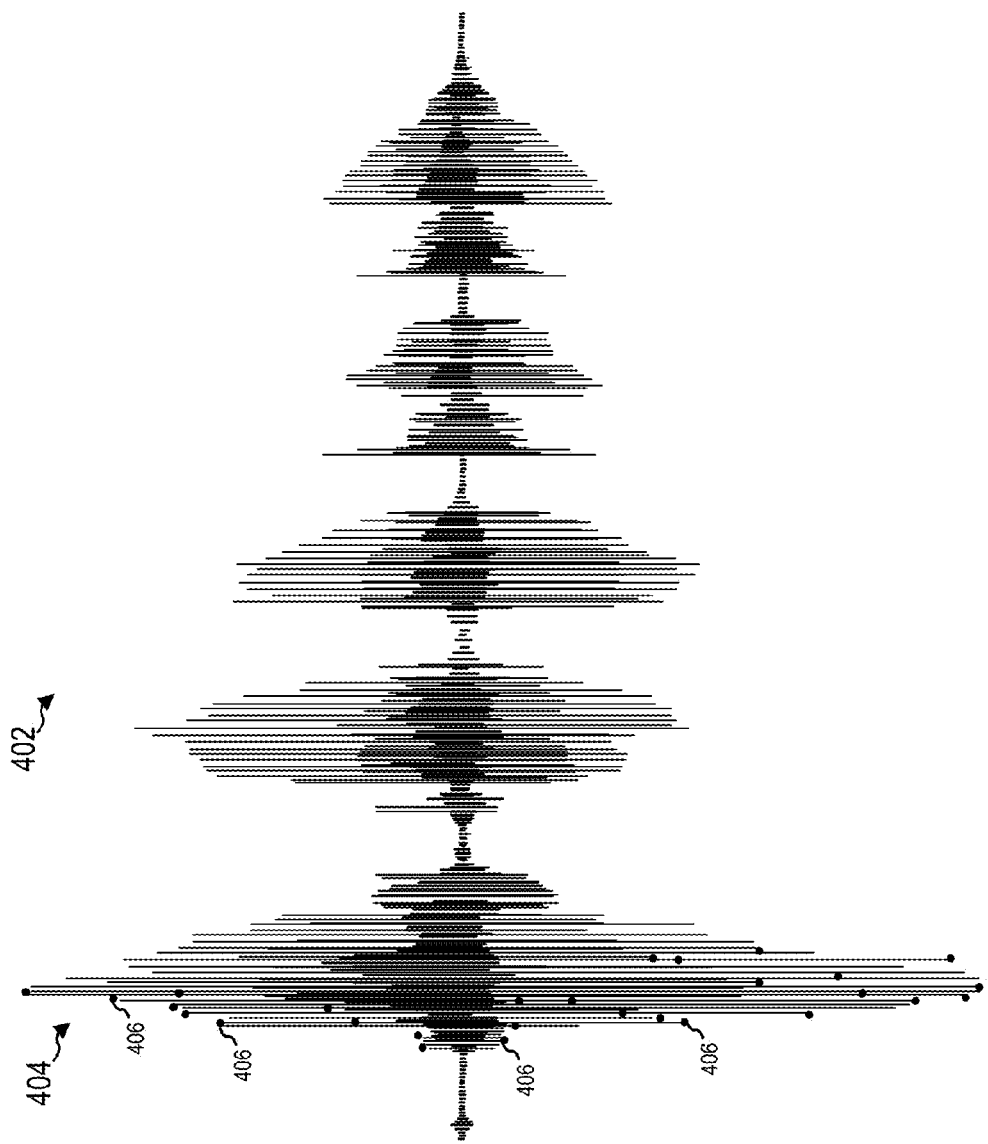
FIG. 4 illustrates an audio waveform processed according to one aspect of the present disclosure.

Received audio data may be sent to the AFE 216 for processing. The AFE 216 may reduce noise in the audio data, identify parts of the audio data containing speech for processing, and segment or portion and process the identified speech components. The AFE 216 may divide the digitized audio data into frames or audio segments, with each frame representing a time interval, for example 10 milliseconds (ms). During that frame the AFE 216 determines a set of values, called a feature vector, representing the features/qualities of the utterance portion within the frame. Feature vectors may contain a varying number of values, for example forty. The feature vector may represent different qualities of the audio data within the frame. FIG. 4 shows a digitized audio data waveform 402, with multiple points 406 of the first word 404 as the first word 404 is being processed. The audio qualities of those points may be stored into feature vectors. Feature vectors may be streamed or combined into a matrix that represents a time period of the spoken utterance. These feature vector matrices may then be passed to the speech recognition engine 218 for processing. A number of approaches may be used by the AFE 216 to process the audio data. Such approaches may include using mel-frequency cepstral coefficients (MFCCs), perceptual linear predictive (PLP) techniques, neural network feature vector techniques, linear discriminant analysis, semi-tied covariance matrices, deep belief networks or other approaches known to those of skill in the art.

Processed feature vectors may be output from the ASR module 214 and sent to an output device for transmission to another device for further processing. The feature vectors may be encoded and/or compressed by an encoder/decoder (not shown) prior to transmission. The encoder/decoder may be customized for encoding and decoding ASR data, such as digitized audio data, feature vectors, etc. The encoder/decoder may also encode non-ASR data of the ASR device 100, for example using a general encoding scheme such as .zip, etc. The functionality of the encoder/decoder may be located in a separate component or may be executed by the controller/processor 204, ASR module 214, or other component, for example.

The speech recognition engine 218 may process the output from the AFE 216 with reference to information stored in the speech storage 220. Alternatively, post frontend processed data (such as feature vectors) may be received by the ASR module 214 from another source besides the internal AFE 216. For example, another entity may process audio data into feature vectors and transmit that information to the ASR device 100 through the input device(s) 206. Feature vectors may arrive at the ASR device 100 encoded, in which case they may be decoded (for example by the encoder/decoder) prior to processing by the speech recognition engine 218.

The speech storage 220 includes a variety of information for speech recognition such as data matching pronunciations of phonemes to particular words. This data may be referred to as an acoustic model. The speech storage may also include a dictionary of words or a lexicon. The speech storage may also include data describing words that are likely to be used together in particular contexts. This data may be referred to as a language or grammar model. The speech storage 220 may also include a training corpus that may include recorded speech and/or corresponding transcription, that may be used to train and improve the models used by the ASR module 214 in speech recognition. The training corpus may be used to train the speech recognition models, including the acoustic models and language models, in advance. The models may then be used during ASR processing.

The training corpus may include a number of sample utterances with associated feature vectors and associated correct text that may be used to create, for example, acoustic models and language models. The sample utterances may be used to create mathematical models corresponding to expected audio for particular speech units. Those speech units may include a phoneme, syllable, part of a syllable, word, etc. The speech unit may also include a phoneme in context such as a triphone, quinphone, etc. Phonemes in context used regularly in speech may be associated with their own models. Phonemes in context that are less common may be clustered together to have a group model. By clustering phoneme groups in this manner, fewer models may be included in the training corpus, thus easing ASR processing. The training corpus may include multiple versions of the same utterance from different speakers to provide different utterance comparisons for the ASR module 214. The training corpus may also include correctly recognized utterances as well as incorrectly recognized utterances. These incorrectly recognized utterances may include grammar errors, false recognition errors, noise, or other errors that provide the ASR module 214 with examples of error types and corresponding corrections, for example.

Other information may also be stored in the speech storage 220 for use in speech recognition. The contents of the speech storage 220 may be prepared for general ASR use or may be customized to include sounds and words that are likely to be used in a particular application. For example, for ASR processing at an ATM (automated teller machine), the speech storage 220 may include customized data specific to banking transactions. In certain instances the speech storage 220 may be customized for an individual user based on his/her individualized speech input. To improve performance, the ASR module 214 may revise/update the contents of the speech storage 220 based on feedback of the results of ASR processing, thus enabling the ASR module 214 to improve speech recognition beyond the capabilities provided in the training corpus.

The speech recognition engine 218 attempts to match received feature vectors to words or subword units as known in the speech storage 220. A subword unit may be a phoneme, phoneme in context, syllable, part of a syllable, syllable in context, or any other such portion of a word. The speech recognition engine 218 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The speech recognition engine 218 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 218, the state may change or stay the same, based on the processing of the new feature vectors. A Viterbi algorithm may be used to find the most likely sequence of states based on the processed feature vectors.

Figure 5:
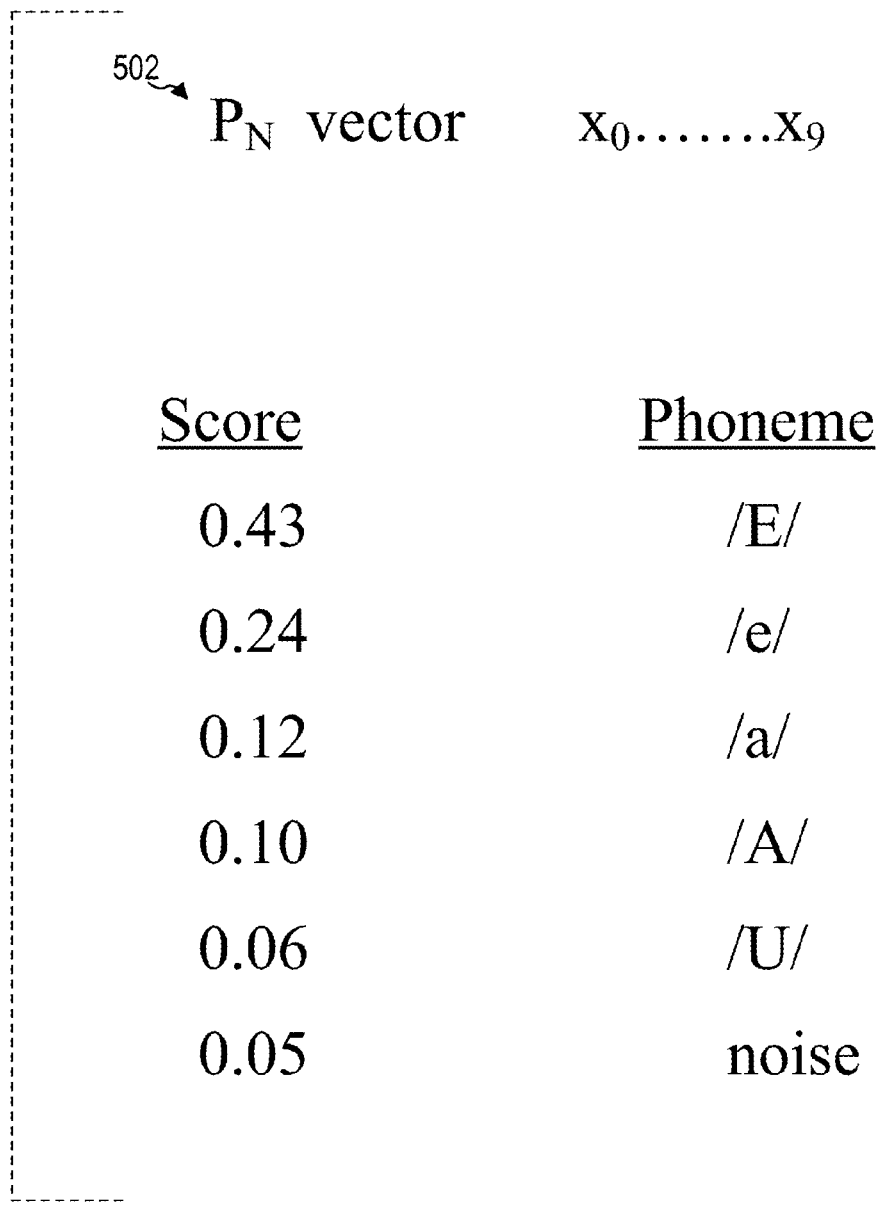
FIG. 5 illustrates phoneme processing according to one aspect of the present disclosure.

In one example, the speech recognition engine 218 may receive a series of feature vectors for sound corresponding to a user saying "Hello, how are you today?" The speech recognition engine 218 may attempt to match each feature vector with a phoneme in the speech recognition database 220. For example, FIG. 5 shows a series of feature vectors 502 corresponding to phoneme $P_N$ (representing the "e" sound in "hello"), including ten feature vectors $X_0$ through $X_9$. Upon processing of the first feature vector, the speech recognition engine 218 makes a preliminary determination as to the probability that the feature vector matches a phoneme, shown as the score in FIG. 5. Based on the feature vector, the phoneme /E/ may be assigned an initial score of 0.42, phoneme /e/ (a different pronunciation from /E/) may be assigned a score of 0.24, etc. The score may be based on how closely the feature vector matches a distribution associated with a phoneme state within one or more acoustic models stored in the speech storage 220. A feature vector may also be assigned a score that the feature vector represents noise or silence. In the example of FIG. 5, the score that the feature vector represents noise is 0.05.

Figure 6:
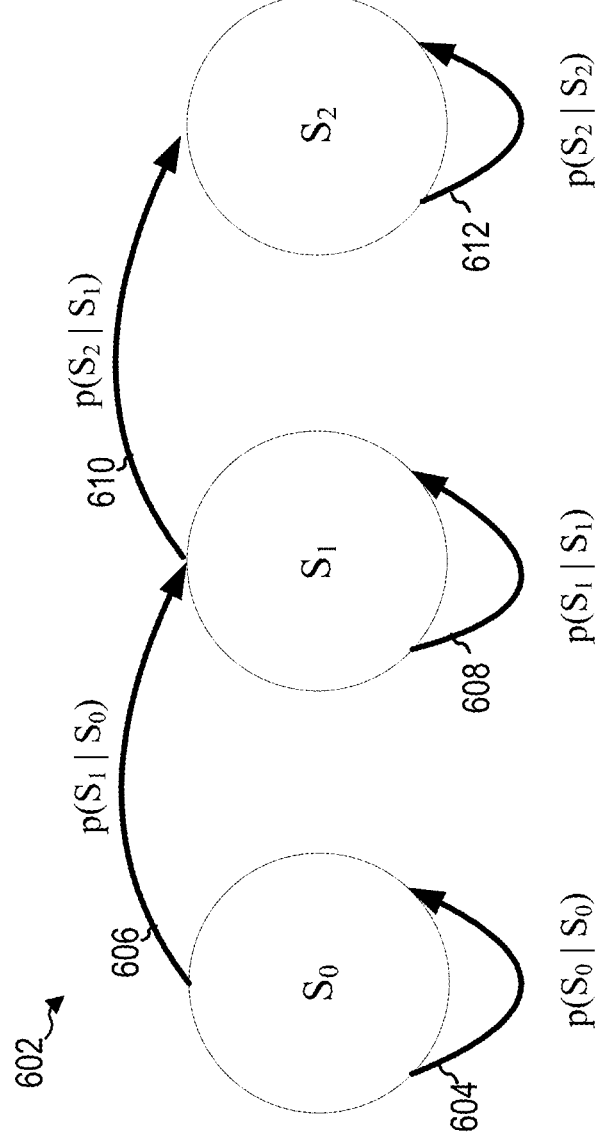
FIG. 6 illustrates phoneme processing in a Hidden Markov Model according to one aspect of the present disclosure.

Taking the example of the feature vector with a score of 0.42 for the phoneme /E/ shown in FIG. 5, the speech recognition engine 218 initially assigns a score of 0.42 that the feature vector matches the first state of the phoneme /E/, shown as state $S_0$ in the Hidden Markov Model illustrated in FIG. 6. After further processing, the speech recognition engine 218 determines whether the state should either remain the same, or change to a new state. For example, whether the state should remain the same 604 may depend on the corresponding transition probability (written as P($S_0$|$S_0$), meaning the probability of going from state $S_0$ to $S_0$) and how well the subsequent frame matches states $S_0$ and $S_1$. If state $S_1$ is the most probable, the calculations move to state $S_1$ and continue from there. For subsequent frames, the speech recognition engine 218 similarly determines whether the state should remain at $S_1$, using the transition probability represented by P($S_1$|$S_1$) 608, or move to the next state, using the transition probability P($S_2$|$S_1$) 610. As the processing continues, the speech recognition engine 218 continues calculating such probabilities including the probability 612 of remaining in state $S_2$ or the probability of moving from a state of illustrated phoneme /E/ to a state of another phoneme. After processing the feature vectors for state $S_2$, the speech recognition may move to the next phoneme in the utterance.

The probabilities and states may be calculated using a number of techniques. For example, probabilities for each state may be calculated using a Gaussian model, Gaussian mixture model, or other technique based on the feature vectors and the contents of the speech storage 220. Techniques such as maximum likelihood estimation (MLE) may be used to estimate the probability of phoneme states.

In addition to calculating potential states for one phoneme as a potential match to a feature vector, the speech recognition engine 218 may also calculate potential states for other phonemes, such as phoneme /e/ and/or phoneme /a/ for the example shown in FIG. 5 as potential matches for the feature vector. In this manner multiple states and state transition probabilities may be calculated.

The probable states and probable state transitions calculated by the speech recognition engine 218 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The speech recognition engine 218 may also compute scores of branches of the paths based on language models or grammars. Language modeling involves determining scores for what words are likely to be used together to form coherent words and sentences. Application of a language model may improve the likelihood that the ASR module 214 correctly interprets the speech contained in the audio data. For example, acoustic model processing returning the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance. The language modeling may be determined from a training corpus stored in the speech storage 220 and may be customized for particular applications.

Figure 7:
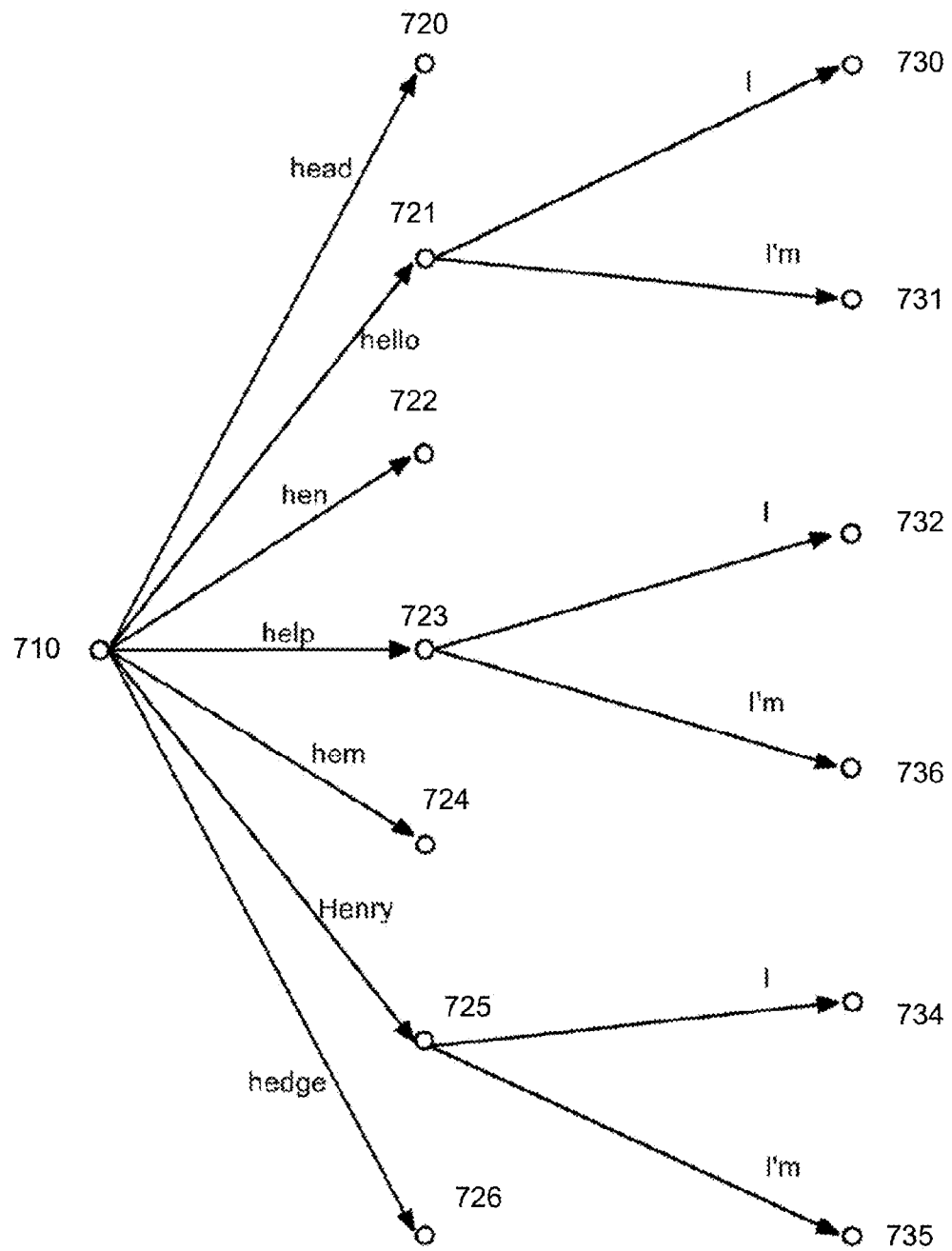
FIG. 7 illustrates a word result network according to one aspect of the present disclosure.

As part of the language modeling (or in other phases of the ASR processing) the speech recognition engine 218 may, to save computational resources, prune and discard low recognition score states or paths that have little likelihood of corresponding to the spoken utterance, either due to low recognition score pursuant to the language model, or for other reasons. Further, during the ASR processing the speech recognition engine 218 may iteratively perform additional processing passes on previously processed utterance portions. Later passes may incorporate results of earlier passes to refine and improve results. As the speech recognition engine 218 determines potential words from the input audio the lattice may become very large as many potential sounds and words are considered as potential matches for the input audio. The potential matches may be illustrated as a word result network representing possible sequences of words that may be recognized and the likelihood of each sequence. FIG. 7 shows an example of a word result network that may be used by a speech recognition engine 218 for recognizing speech according to some aspects of the present disclosure. A word result network may consist of sequences of words that may be recognized and the likelihood of each sequence. The likelihood of any path in the word result network may be determined by an acoustic model and a language model. In FIG. 7, the paths shown include, for example, "head", "hello I", "hello I'm", "hen", "help I", "help I'm", ""hem", "Henry I", "Henry I'm", and "hedge".

As illustrated in FIG. 7, a word result network may start at initial node 710. At node 710, no words may have been recognized yet as the speech recognition engine 218 commences its processing. From node 710, the speech recognition engine 218 may create arcs and additional nodes where each arc may be associated with a potential word that may be recognized. In some applications, words may be represented by nodes instead of arcs. In FIG. 7, arcs from node 710 to nodes 720 to 726 are labeled with example words that may be recognized by the speech recognition engine 218.

From initial node 710, the speech recognition engine 218 may apply acoustic and language models to determine which of the arcs leaving node 710 are most likely to occur. For an acoustic model employing HMMs, speech recognition engine 218 may create a separate HMM for each arc leaving node 710. Applying the acoustic and language models the speech recognition engine 218 may decide to pursue some subset of the arcs leaving node 710. For example, in FIG. 7, the speech recognition engine 218 may decide to follow the paths starting with "hello", "help", and "Henry" and may decide to stop pursuing the paths starting with "head", "hen", and "hedge" based on the respective scores of those arc, with the speech recognition engine 218 pursuing only the higher scoring arcs in an effort to concentrate computing resources on the arcs most likely to result in a correct result.

The speech recognition engine 218 may return an N-best list of paths along with their respective recognition scores, corresponding to the top N paths as determined by the speech recognition engine 218. An application (such as a program or component either internal or external to the ASR device 100) that receives the N-best list may then perform further operations or analysis on the list given the list and the associated recognition scores. For example, the N-best list may be used in correcting errors and training various options and processing conditions of the ASR module 214. The speech recognition engine 218 may compare the actual correct utterance with the best result and with other results on the N-best list to determine why incorrect recognitions received certain recognition scores. The speech recognition engine 218 may correct its approach (and may update information in the speech storage 220) to reduce the recognition scores of incorrect approaches in future processing attempts.

In one aspect of the disclosure, the speech recognition engine 218 may use a finite state transducer (FST) instead of a word result network. An FST is a graph that may include all possible words that may be recognized by the speech recognition engine 218. While the word result network of FIG. 7 may be created dynamically to recognize words, an FST may be static in that it is created in advance and the same FST may be used for the recognition of all utterances.

An FST may include paths for all sequences of words that may be recognized. The creation of an FST may be visualized by starting with the word result network of FIG. 7. The word result network of FIG. 6 may be built out to include all possible utterances that could be recognized by an engine. Such a word result network would be potentially unbounded in size unless there was a limitation on the length of utterances that could be recognized. If the lexicon consisted of 100,000 words, there may be 100,000 arcs leaving the initial node of the node of the word result network. For each of the initial words, there may be 100,000 words that could follow. Thus, after only two words, there may be as many as 10 billion paths through the word result network. As utterances of three or more words are included, the size of the word result network will grow considerably larger.

An FST may allow for the recognition of all the words in the above word result network, but may do so with a graph that is smaller than the word result network. An FST may be smaller because it may have cycles and/or it may be determined and/or minimized. An FST may be determined if, for each node in the FST, each arc exiting the node has a different label. An FST may be minimized if it has the minimum number of possible nodes. For example, depending on the application, a given word may appear only once in an FST, and an FST may be cyclical so that a given arc of the FST may be traversed more than once for a single utterance. For other applications, words may appear in an FST more than once so that that context of the word may be distinguished. Although the above example considered an FST of words, an FST may represent sequences of other types, such as sequences of HMMs or HMM states. A larger FST may be creating by composing other FSTs. For example, an FST that includes words and phones may be created by composing an FST of words with an FST of phones.

Figure 8:
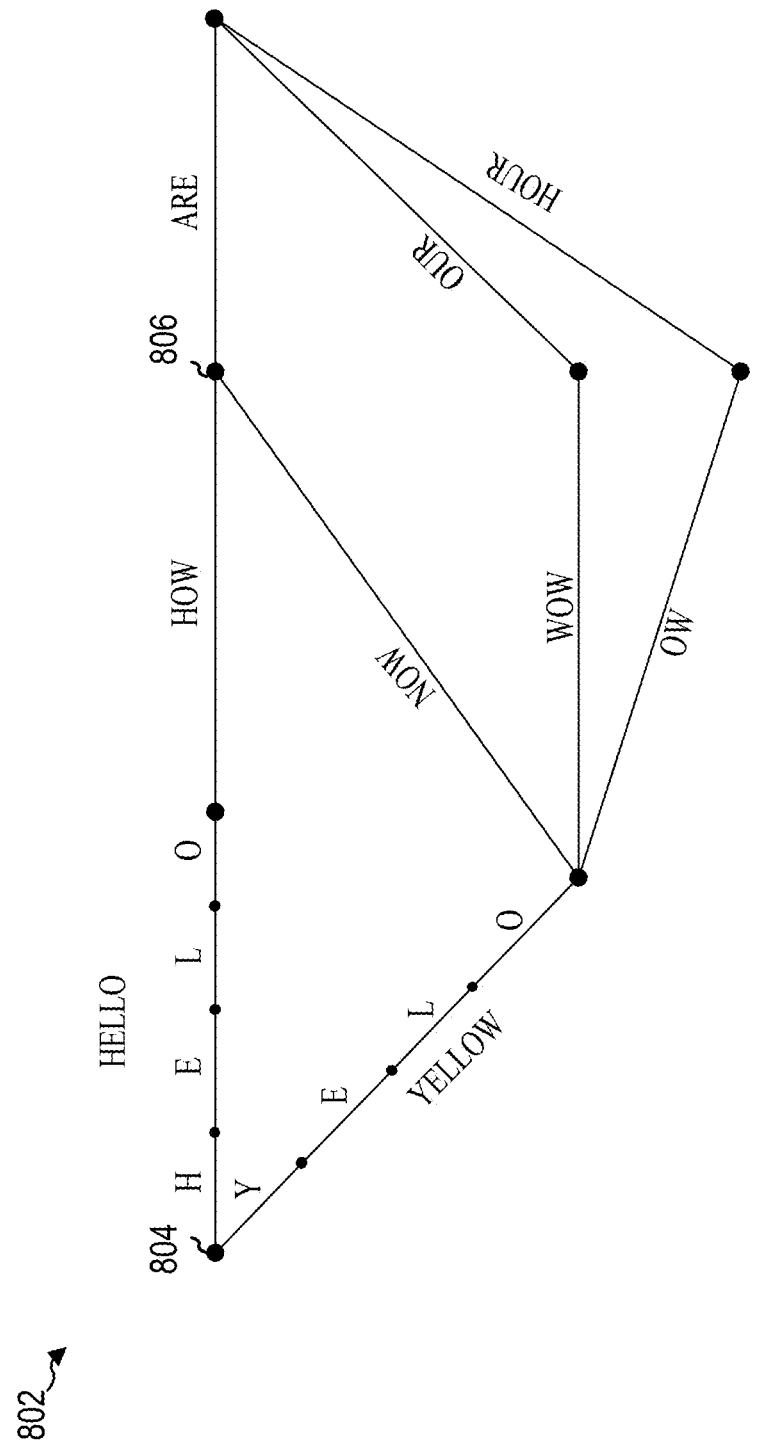
FIG. 8 illustrates a speech recognition lattice according to one aspect of the present disclosure.

The speech recognition engine 218 may combine potential paths into a lattice representing speech recognition results. A sample lattice is shown in FIG. 8. The lattice 802 shows multiple potential paths of speech recognition results. Paths between large nodes represent potential words (for example "hello", "yellow", etc.) and paths between smaller nodes represent potential phonemes (for example "H", "E", "L", "O" and "Y", "E", "L", "O"). For purposes of illustration, individual phonemes are only shown for the first two words of the lattice. The two paths between node 804 and node 806 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the speech recognition engine 218 as the ASR result for the associated feature vectors. Following ASR processing, the ASR results may be sent by the ASR module 214 to another component of the ASR device 100, such as the controller/processor 204 for further processing (such as execution of a command included in the interpreted text) or to the input/output interfaces 202 for sending to an external device.

Following ASR processing, the ASR results may be sent by the ASR module 214 to another component of the device 100 or to the input/output interfaces 202 for sending to an external device. For example, ASR results in the form of a textual representation of the speech, an N-best list, lattice, etc. may be sent to a natural language understanding (NLU) unit 226 for natural language processing, such as conversion of the text into commands for execution. The NLU unit 226 may be a separate component or may be part of a speech processing module 240.

The NLU unit 226 may include a dedicated NLU engine, processor, memory, storage, named entity recognition (NER) module (not pictured), intent classification (IC) module (not pictured), and/or other components, and/or may use components otherwise available on the device 100. The NLU unit takes the textual output of ASR processing and attempts to make a semantic interpretation of the ASR result. That is, the NLU unit determines the meaning behind the text based on the individual words and then implements that meaning. The NLU unit interprets a text string (such as the text output by the ASR module 214) to derive an intent or a desired action from the user as well as the pertinent pieces of information in the text that let allow the device to complete that action. For example, if a spoken utterance is processed by an ASR module and outputs the text "call mom" the NLU unit will determine that the user intended to activate a telephone in his/her device and to initiate a call with a contact matching the description "mom." The NLU may be configured to annotate text as part of NLU processing. For example, for the text "call mom," "call" may be annotated as a command (to execute a phone call) and "mom" may be annotated as a target of the command (and the telephone number for "mom" in a contact list may be included in the annotation). To correctly perform NLU processing of speech input the NLU may be configured to communicate with a variety of other components/applications of a device such as a phone, contact list, calendar, music player, etc.

The NLU processing is based on the models and programming available to the NLU unit. Such models may be grammar based, rule based or constructed in a different manner. The NLU may store a training corpus that may include precoded text and/or the corresponding commands that go with the text, that may be used to train and improve the models used by the NLU unit 226 in natural language understanding. The training corpus may be used to train the NLU models, which may then be used during NLU processing.

An NLU unit 226 may receive a wide variety of textual inputs that should result in a wide variety of executed commands. For example, a user may instruct a device to "call mom" to activate a phone program and start a call to a contact labeled "mom", "play poker" to activate a poker game program, "what is the weather today" to activate device locating data, cross reference that with weather data and display the weather data to a user and/or activate a weather application, etc. In this manner the NLU may initiate instructions to other components/applications of a device in order to perform actions the NLU believes have been commanded by a user. NLU processing may be performed by a local device or by a remote device. If performed by a remote device, the remote device may then send instructions to a local device to perform operations based on the NLU results. In another example, using a system described herein, the NLU unit 226 may process received ASR results to create instructions/commands for a different non-ASR capable device, such as set-top box 102, display 210, etc.

In a traditional system for performing ASR and natural language processing (NLP) a user typically inputs a speech command into a device for performing an operation on that device. For example, a user may speak a command such as "show me the weather for this week" into a mobile device and expect that mobile device to display the requested weather report. While multiple devices may combine to convert the speech into text (ASR), and the text into a command (NLP), the user typically interacts with the same device when speaking and when reviewing the results of the spoken command. As described herein, however, a user may also control non-ASR/NLP configured devices using speech commands. For example, referring again to FIG. 1, a user may speak into ASR device 100 with a command to change a channel viewed on a television. The ASR device 100 (possibly in combination with other devices, such as a remote ASR/NLP device) may convert the speech into text, convert the text into a command suitable for the set-top box 102, and send the command to the set-top box 102 from the ASR device's input/output device interfaces 202 over the network 110 to the set-top box 102. In this manner the ASR device 100 may receive and process speech commands for a different device, allowing the user to control other devices using the speech processing capabilities of device 100.

In order to process commands for non-ASR devices, an ASR device may be configured with specialized grammars to improve ASR processing. A grammar configuration module 230 may configure grammars for such purposes as described below. Such specialized grammars may configure an ASR device to be more capable of recognizing particular speech for commands of the non-ASR device (for example, "change the channel to ESPN" for controlling set-top box 102 or "turn the ice-maker on" for controlling refrigerator 104, etc.). Such specialized grammars may be pre-defined for particular device types/functionality, in which case the ASR device may download the grammar from a central repository and incorporate it into an ASR device. Or such a grammar may be defined dynamically based on the non-ASR device's type/functionality as described below. Similarly, NLP settings such as command type, syntax, etc. for creating commands for the non-ASR device may also be incorporated by the ASR device. As described here, a system is illustrated with an ASR device connected to the network and acting as a coordinator for configuring new devices to be controlled through speech commands. Although illustrated as a single device, the functionality described herein may be divided among various devices that may be included in the network or located remotely. For example, multiple ASR devices may be locate throughout a home to receive speech commands and may connect to a different device, such as a remote server, for performing complex ASR/NLP processing associated with the speech commands.

Where ASR is performed using a grammar, the grammar may be configured to perform the functions of an NLU unit as well as providing a language model for the ASR. For example, a grammar may include paths for all of the commands that may be understood for a device. The paths of the grammar are used to constrain the speech recognition and improve the speech recognition accuracy. The paths of the grammar may also correspond to specific device commands and accordingly the paths of the grammar may be used to understand the meaning of the user's utterance and also to generate the appropriate command or instruction. For example, where a user speaks "call mom," the grammar will be used during speech recognition to help recognize the spoken words. The grammar may also indicate, by virtue of following the path for "call," that the user would like to make a phone call, and, by virtue of going down the path for "mom," that the user would like to call mom. The grammar may further be configured to generate the commands to execute a call to mom on a particular device.

In one aspect, an ASR system may detect when a new device is added to a network and may configure speech controls for the new device using an ASR device. A number of technologies and protocols exist to identify when a new device joins a network. For example, if a Bluetooth device is active and enters discover mode, it may identify other Bluetooth devices that are "visible" to the device. Other discovery protocols such as Zeroconf, Bonjour, WiFi direct, search and discovery protocol (SDP), etc. may also be used to discover a new device. The network may be a local area network (LAN), wide area network (WAN) or other network. In another aspect a new device may detect an available network and affirmatively attempt to be added to the network. In another aspect the user may indicate to the ASR device (either through a speech input or otherwise) that a new device has been added to the network. For example, the ASR device may be configured to recognize commands such as "I have installed a new refrigerator" and initiate the device adding algorithm in response to such a user command. The user may also add an off-site device to be controlled by the ASR device. For example, the user may subscribe to a remote data storage service with associated storage devices. The user may initiate control of the storage devices and/or related services using the ASR device.

When a new device joins a network, or otherwise becomes accessible to an ASR device, the new device may establish a communication link with the ASR device, or to a central network manager, and communicate the identity and/or capabilities of the new device. That is, the new device may describe its functionality to another device on the network. This description of functionality may be sent in response to a query from another device on the network. The functionality may describe an entirety of functions that the new device is capable of, or just a subset of the new device's functionality, such as the subset of controls that may be executed in response to a remotely issued command.

For example, if a user adds a new music player to a home network, the new music player may identify itself to the network and may identify its type (e.g., "music player"), as well as list all of its functions to another device, such as play music, download music, search music, select output speaker, etc. The new device may send an existing device the identity of the new device (which may include a model number, serial number, or some other identifier). The identity may itself indicate the new device's capabilities and functionality or the existing device may use the new device's identity to perform a lookup of the new device's capabilities and functionality. In another example, the new device may identify its functionality that may be controlled remotely, along with the commands necessary to execute the relevant commands. For example, if a music paying device is capable of playing music in response to receiving a particular command over the network (either wirelessly or through a wired connection) the music playing device may notify another networked device of that capability. In another example, the music playing device may also be capable of playing music in response to a specific infrared (IR) signal, such as one that may be used by a traditional remote control. The music playing device may notify another networked device of this capability as well, in case one or more devices on the network may have infrared capabilities. In another example, the music playing device, which may lack its own ASR/NLU capabilities, may have its own ASR grammar or NLU settings which are configured to allow speech control of the music playing device by another device which is capable of speech processing. The non-ASR may then send its associated ASR grammar and/or NLU settings to an ASR/NLU capable device so that the music playing device may be controlled through speech processed by the ASR/NLU capable device. The non-ASR device may also include a microphone to capture audio signals including speech and send them to the ASR/NLU capable device for processing.

In one aspect, the non-ASR device may be configured with a component, such as a hardware chip, that included the information and controls necessary to synchronize the non-ASR device for speech control by an ASR device. The chip may include components such as a memory to store an ASR grammar, NLU settings package, device identifier, list of controllable commands, and the like. The chip may also include an antenna, transceiver, network interface and/or other input/output mechanisms to communicate with a network and/or ASR device.

As part of the introduction to the network, the new device may also identify its abilities to perform ASR processing and/or execute speech commands. If a new device joins a network that does not have ASR capabilities, or has limited ASR capabilities that do not cover the full range of remotely controllable functions of the new device, a number of steps may be taken to allow for improved speech control of the new device by other ASR capable devices that are on the network and capable of communicating with the new device.

Figure 9:
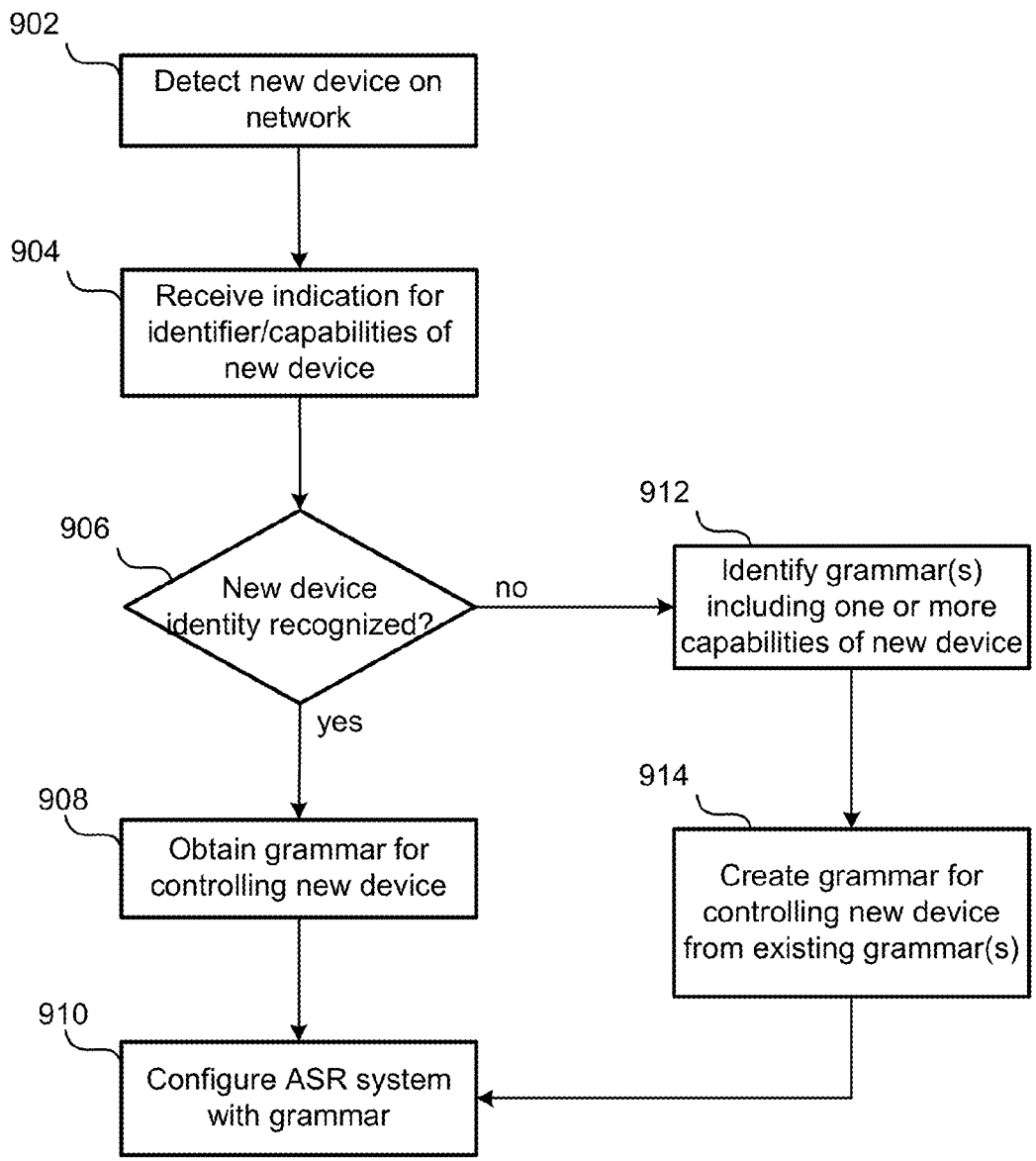
FIG. 9 illustrates a method for controlling non-ASR devices with speech according to one aspect of the present disclosure.

An example for configuring an ASR device with a grammar to control a non-ASR device with speech commands is shown in FIG. 9. First, an ASR device detects a new non-ASR device on a network, as shown in block 902. When a new non-ASR device becomes accessible to an ASR device, the ASR device receives information from the new device on its identity (which may include a manufacturer, model number, general description, etc.) and/or information on the new device's functionality and capabilities, as shown in block 904. The ASR device also receives information regarding how to communicate with the new device, such as preferred communication protocols, how to instruct the new device to perform specific operations, etc. The ASR device may then take the identity/functionality information and communicate with a central storage device that tracks non-ASR device types/functionality and stores corresponding ASR grammars and NLP settings which may be used by ASR devices to receive and process speech commands for the respective non-ASR devices. The ASR device may send the central storage device an identity (such as model number, serial number, or other identifier) for the central storage device to cross reference when looking up to see if the non-ASR device type is recognized. If the device identity is recognized (906, yes), the central storage device then sends the ASR device one or more grammars and/or NLP settings packages (908) associated with the non-ASR device(s) to the ASR device to store in storage 228 and incorporate into its grammar configuration module 230, as shown in block 910. The grammar and/or NLP settings package may also be obtained from the non-ASR device itself, should the non-ASR device have such information available. The grammar and/or NLP settings package may also be obtained from a different source. With that additional information incorporated, the ASR device may be configured to receive and process speech commands for the new device. When commands for the new device are received, the ASR device may perform ASR/NLP processing and communicate the results of that processing using commands recognized by the new non-ASR device to the new device through the appropriate communication protocol, such as over a network, using IR commands (with an appropriate IR transmitter), etc.

In certain circumstances, a central storage device may not have a preconfigured grammar/NLP settings package appropriate for the new device type and a grammar/NLP settings package may not be readily available from the non-ASR device itself or from another source. When this happens (906, no) the ASR device may configure speech commands for the new device using a number of techniques. In one aspect, the ASR device and/or central storage device may compare the functionality of the new device with the functionality of other known devices to configure a specialized grammar/NLP settings package for the new device, based on one or more grammars/NLP settings packages for other devices. For example, a central storage device may store multiple grammars for different models of music players and multiple grammars for different models of set-top boxes to control televisions. A new non-ASR device may connect to a home network and indicate to the ASR device that the new device is capable of playing music from a home music catalog, stream music from a remote location, tune to a cable television signal, and control a television. The ASR device may then check the central storage device for a preset grammar for the new device. When such a grammar is not found, the ASR device (and/or central storage device) may compare a specific list of available commands for the new device with existing grammars for controlling other devices with similar available commands, as shown in block 912 of FIG. 9. If any overlapping commands are found the ASR device may take portions (or all) of the respective existing grammars to create a grammar for the new device, as shown in block 914. The new grammar may combine grammar portions of multiple different devices. For example, the ASR device may create a grammar for the new device from existing grammars of three other music playing devices and two other set-top box devices based on the overlapping functionality between those devices and the new device. The new grammar may then be used to configure the ASR system, as shown in block 910. If the new grammar does not sufficiently cover the functions of the new device, the ASR device may adjust the new grammar through a training session with the user, and from learning how the user interacts with the new device once certain speech controls for the new device are active. Further, once a grammar for the new device has been created (and tested) the ASR device may upload the grammar to the central storage device so the grammar may be made available when other examples of the new device are activated to other networks. Similarly, existing grammars/NLP settings packages for controlling other non-ASR devices may be edited and adjusted by ASR devices and/or central storage devices to allow for dynamic adjustments and better speech control of the non-ASR devices by ASR devices. For example, tendencies of a user (such as particular speech control shortcuts or preferences) may be incorporated into the ASR device to better control the non-ASR devices. Such user tendencies may be uploaded to a central service (for example, the central storage device discussed above, or to another service) which manages ASR tendencies. If ASR control tendencies or trends are recognized in some users, the settings for those tendencies and/or trends may be pushed to ASR devices of other users to speed up device learning and configuration.

In one aspect the non-ASR device may also communicate an available catalog of media to the ASR device for purposes of refining speech control. For example, a non-ASR media player may indicate to the ASR device the names of songs, artists, movies, television shows, etc. available to the media player, thus enabling the ASR device to configure a grammar/NLP settings package based on the catalog of available media. In another aspect, the grammar used by the ASR device to control the functionality of the media player may be separate from the grammar used by the ASR device to refer to specific media. In this manner separate grammars may be constructed/updated and shared across ASR devices allowing for customized, and possibly more easily updated, speech controls for the non-ASR media player. For example, if a media player subscribes to a service offering certain media such as music and movies available for viewing on a monthly basis, the ASR device may update a grammar associated with the available media each month to ensure updated speech controls for the media device, whereas the ASR device may not update the grammar associated with the functionality of the media device as frequently.

In one aspect, a certain amount of training by a user may be involved in order to fully activate speech control for a new non-ASR device. After the new device is added to the network, as the ASR device incorporates (or creates) a grammar for the new device, the ASR device may request that the user provide spoken examples of commands that will be used to operate the new device. In this manner the ASR device may train on the user's voice for the specific commands (for example, learning how the user pronounces the relevant words) and may train on the user's preference for use of words for specific commands, for example, if the user prefers to play a song by stating the command as "bring up <song x>" rather than "play <song x>". The ASR device may also apply the user's history and/or spoken preferences for other devices to the new device if appropriate, based on the overlapping functionality of the new device, the location of the new device, or other factors. In this manner, user-based models for device control may be applied by the ASR device to control multiple non-ASR devices.

In one aspect, the registration of a new device into a network may be automatically managed by the ASR device. In another aspect, the registration may involve a registration configuration with a user. During configuration of a new device for control by the ASR device a user may indicate how he/she wishes to control the new device including indicating a preferred spoken name/spoken identifier for the new device, a location for the new device (for example, "upstairs television" v. "downstairs television"), desired method for controlling the new device (for example, a desire to control a new audio player in a manner different from an existing audio player), security settings (such as only allowing control of a new device by certain users), and the like.

Many of these device settings may also be initially determined automatically by the ASR device. For example, the ASR device may determine a location of the new device by analyzing factors such as the new device's radio frequency (RF) fingerprint (which may indicate proximity to known network transmitters), a barometric pressure experienced by the device (which may indicate what floor the device is on), GPS coordinates, etc. The ASR device may also initially set the new device to be controlled similarly to other devices of the same type, such as through applying an existing music player configured grammar to a new music player. The new device may also assist in this process by communicating with the ASR device and/or with other devices on the network to determine the new device's location, etc. With such settings incorporated, more precise speech control of devices may be implemented as the ASR device may be better able to differentiate between intended devices when receiving commands (for example, "play the Beatles downstairs.")

In one aspect an ASR device may allow for the ability for one device on a network to communicate with another device on the network in executing speech commands. For example, a home network may include an ASR device and a series of non-ASR thermostats but only one of the thermostats (for example, a master thermostat) may be able to communicate with the ASR device, such as over the network. The ASR device may be able to receive and process speech commands for each of the series of thermostats (for example, to control the temperature in specific rooms) but may need to route the commands for the non-master thermostats through the master.

As the ASR device incorporates grammars for processing speech commands for multiple devices (including itself), a weighting system may be incorporated to adjust the internal weights applied during ASR and NLP processing in an attempt to more accurately capture a user's speech and intended command. For example, when processing a speech input to determine whether the speech included the word "bake" or "take", certain paths for ASR processing may be weighted depending on whether the user is likely to be entering commands for an oven under the present conditions. For example, words for commands directed to an oven may be weighted lower than words for commands for a music player when a spoken command is received from a microphone located in a family room (while the reverse may be true for a spoken command coming from a kitchen). Weighting may also be applied to NLP portions of processing. For example, a user may say "turn it down" when intending to lower a volume of a music player, when intending to dim lights in a certain room, or when intending to adjust a temperature. Based on a user's previous behavior, where the speech command is received, the most recent user command, etc. the ASR device may weigh the incoming speech and interpret the received command in different ways. Similarly, a spoken command of "call up the police" may be interpreted to initiate a telephone call with law enforcement or to play songs by the band The Police. Various conditions may be evaluated to push ASR/NLP results in one direction or another depending on what the ASR device deems the most likely command intended by the user.

Once a grammar and/or NLP settings appropriate to control the non-ASR device are incorporated into the speech processing capabilities of the ASR device, the ASR device may enable speech control of the non-ASR device as follows. The ASR device receives a speech command intended for the non-ASR device. The ASR device then processes the speech using, among other things, the grammar and/or NLP settings associated with the functional capabilities/type of the non-ASR device. The ASR device then converts that speech into an executable command instruction that may be sent from the ASR device to the non-ASR device. For example, a networked communication including the command to the non-ASR device in a form understandable by the non-ASR device, an IR signal pulse, etc. The command instruction is then sent from the ASR device to the non-ASR device over an appropriate communication channel, thereby causing the non-ASR device to execute the command included in the original speech.

The ASR device may also be configured to receive acknowledgement messages from the non-ASR device to reflect the command the non-ASR device received. The ASR device may then create an acknowledgement query to the user (which may incorporate information from the acknowledgement message from the non-ASR device) to ensure that the desired command is about to be executed. Upon confirmation from the user the ASR device may instruct the non-ASR device to execute the command. If the user indicates the pending command is incorrect, the ASR device may cancel the pending command and issue a new command to the non-ASR device. The new command may also be subject to an acknowledgment and confirmation prior to execution.

The systems, processes, and algorithms disclosed herein may be implemented in various combinations of software, firmware, and/or hardware. Further, the various embodiments may be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and protocols. Such a system also may include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of communication, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java, C, C# or C++, or any scripting language, such as Perl, Python, or TCL, as well as combinations thereof. The server(s) may also include database servers, including without limitation those commercially available from Oracle, Microsoft, Sybase, and IBM.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, keypad, or microphone), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system or device. Based on the disclosure and teachings provided herein, a person of ordinary skill in the art will appreciate other ways and/or methods to implement the various embodiments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, digital imaging and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

As used in this disclosure, the term "a" or "one" may include one or more items unless specifically stated otherwise. Further, the phrase "based on" is intended to mean "based at least in part on" unless specifically stated otherwise.

What is claimed is:

1. A system for speech control of a non-speech processing device, the system comprising:
   a first device that is not capable of processing speech commands;
   a second device that is capable of processing speech commands; and
   one or more server computers;
   wherein the first device, the second device, and the one or more server computers are configured to perform operations comprising:
      establishing a communication link between the first device and the second device;
      obtaining, by the second device, information about an identity of the first device;
      transmitting, by the second device, the information about the identity of the first device to the one or more server computers;
      obtaining, by the one or more server computers, using the information about the identity of the first device, information about a plurality of instructions executable by the first device, the plurality of instructions including a first instruction and a second instruction;
      determining, by the one or more server computers, a first speech command corresponding to text describing the first instruction;
      determining, by the one or more server computers, a second speech command corresponding to text describing the second instruction;
      obtaining, by the one or more server computers, a speech processing model, wherein the speech processing model is processable to identify the first speech command or second speech command in an audio signal;
      receiving, by the second device, speech including a command for the first device;
      transmitting, by the second device, an audio signal to the one or more server computers, wherein the audio signal corresponds to the speech;
      determining, by the one or more server computers and using the speech processing model, that the audio signal includes the second speech command;
      transmitting, by the one or more server computers, an indication of the second instruction to the second device;
      transmitting, by the second device, the second instruction to the first device; and
      executing, by the first device, the second instruction.

2. The method of claim 1, wherein the information about the plurality of instructions executable by the first device comprises a grammar of commands or list of commands, and wherein the speech processing model comprises a grammar, a language model or a natural language understanding model.

3. The method of claim 1, wherein obtaining the information about the plurality of instructions executable by the first device comprises obtaining the information about the plurality of instructions from a database using the information about the identity of the first device or obtaining the information about the plurality of instructions from the first device.

4. At least one computing device, comprising:
   at least one processor;
   at least one memory component including instructions operable to be executed by the at least one processor to perform a set of actions, configuring the at least one processor to:
      receive information about a first device that is not capable of processing speech commands;
      obtain, using the information about the first device, information about a first instruction executable by the first device;
      determine first text corresponding to the first instruction;
      receive a signal from a second device capable of capturing speech commands, the signal corresponding to audio received by the second device;
      perform speech processing on the signal to identify the first text;
      and
      transmit an indication of the first instruction to the first device or the second device.

5. The computing device of claim 4, wherein the information about the first instruction is included in a list of commands or a grammar including commands.

6. The computing device of claim 4, wherein the at least one processor is further configured to:
   obtain a speech processing model, wherein the speech processing model includes information about the first instruction and comprises a grammar, a language model or a natural language understanding model.

7. The computing device of claim 6, wherein the at least one processor is further configured to obtain the speech processing model by:
   identifying a third device using the information about the first device, wherein the third device is capable of performing at least one function in common with the first device;
   identifying a second speech processing model corresponding to the third device; and
   incorporating into the speech processing model information from the second speech processing model relating to the at least one function in common.

8. The computing device of claim 6, wherein the speech processing model comprises a speech processing model based at least in part on previous speech of the user, the previous speech including at least one instruction executable by the first device.

9. The computing device of claim 4, wherein the at least one processor is further configured to:
   determine a spoken identifier corresponding to the first device; and
   configure a speech processing model with information for processing speech including the spoken identifier.

10. The computing device of claim 4, wherein the at least one processor is further configured to format the first text based on the information about the first device.

11. The computing device of claim 4, wherein the at least one processor is further configured to receive an indication that the first device is in communication with the second device.

12. The computing device of claim 4, wherein the at least one processor is further configured to obtain the information about the first instruction from a database using the information about the first device.

13. The computing device of claim 4, wherein the at least one processor is further configured to obtain the information about the first instruction from the first device or the second device.

14. A non-transitory computer-readable storage medium storing processor-executable instructions for controlling a first computing device, comprising:
- program code to receive information about a second device that is not capable of processing speech commands;
- program code to transmit the information about the second device to one or more server computers;
- program code to receive speech including a command for the second device, the command corresponding to a first instruction executable by the second device;
- program code to transmit a signal corresponding to the speech to the one or more server computers, wherein the one or more server computers determines the first instruction using the signal and a speech processing model created using the information about the second device;
- program code to receive an indication of the first instruction from the one or more server computers; and
- program code to transmit the first instruction to the second device.

15. The computing device of claim 4, wherein the information about the second device comprises a list of commands or a grammar including commands.

16. The computing device of claim 4, wherein the speech processing model comprises a grammar, a language model or a natural language understanding model.

17. The computing device of claim 4, further comprising program code to detect an ability to communicate with the second device.

18. The computing device of claim 4, further comprising program code to transmit to the one or more server computers speech processing information corresponding to previous speech of a user of the computing device, the previous speech including the command.

19. The computing device of claim 4, further comprising:
- program code to receive speech corresponding to an identifier of the second device; and
- program code to transmit the speech corresponding to the identifier of the second device to the one or more server computers.

* * * * *